(12) United States Patent
Zhang et al.

(10) Patent No.: US 9,914,221 B2
(45) Date of Patent: *Mar. 13, 2018

(54) TELEOPERATION OF MACHINES HAVING AT LEAST ONE ACTUATED MECHANISM AND A FAULT DETECTION AND RECOVERY SYSTEM

(71) Applicant: ABB Schweiz AG, Baden (CH)

(72) Inventors: Biao Zhang, West Hartford, CT (US); Jianjun Wang, West Hartford, CT (US); George Q. Zhang, Windsor, CT (US); Sangeun Choi, Simsbury, CT (US); Remus Boca, Simsbury, CT (US); Thomas A. Fuhlbrigge, Ellington, CT (US); Tomas Groth, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,475

(22) Filed: Jun. 8, 2017

(65) Prior Publication Data
US 2017/0334071 A1 Nov. 23, 2017

Related U.S. Application Data

(63) Continuation of application No. 14/649,160, filed as application No. PCT/US2013/072737 on Dec. 3, 2013, now Pat. No. 9,682,480.

(Continued)

(51) Int. Cl.
*G06F 19/00* (2011.01)
*B25J 9/16* (2006.01)

(52) U.S. Cl.
CPC ... *B25J 9/1689* (2013.01); *G05B 2219/40195* (2013.01); *G05B 2219/40204* (2013.01); *Y10S 901/09* (2013.01); *Y10S 901/46* (2013.01)

(58) Field of Classification Search
CPC . B25J 9/16; B25J 9/1689; G05B 2219/40195; G05B 2219/40204;
(Continued)

(56) References Cited

U.S. PATENT DOCUMENTS 5,072,361 A * 12/1991 Davis ................... G05B 19/427
                                                318/568.17
5,239,246 A *  8/1993 Kim ....................... B25J 9/1633
                                                318/560

(Continued)

OTHER PUBLICATIONS

Visinsky et al., A Dynamic Fault Tolerance Framework for Remote Robots, Aug. 1995, IEEE, pp. 477-490.

*Primary Examiner* — Rachid Bendidi
(74) *Attorney, Agent, or Firm* — Taft Stettinius & Hollister LLP

(57) ABSTRACT

A machine has at least one actuated mechanism is remotely located from a control station. A two way real-time communication link connects the machine location with the control station. A controller at the machine location has program code that is configured to determine from data from one or more sensors at the machine location if an actual fault has occurred in the machine when the machine is performing its predetermined function and to determine for an actual fault one or more types for the fault and transmit the one or more fault types to the control station for analysis. The code in the controller is configured to be a preprogrammed trap routine specific to the machine function that is automatically executed when an error in machine operation is detected at the machine location. The controller also has a default trap routine that is executed when the specific routine does not exist.

16 Claims, 6 Drawing Sheets

Related U.S. Application Data

(60) Provisional application No. 61/732,702, filed on Dec. 3, 2012.

(58) Field of Classification Search
CPC ........... G05B 2219/40061; G05B 2219/40136; G05B 2219/40169; G05B 2219/40172; G05B 2219/40173; G05B 2219/40174; G05B 2219/45119; Y10S 901/46; Y10S 901/09; A61B 34/25; A61B 34/30; A61B 34/37
See application file for complete search history.

(56) References Cited

U.S. PATENT DOCUMENTS

| | | | | |
|---|---|---|---|---|
| 2006/0161303 | A1* | 7/2006 | Wang | B25J 9/1689 700/259 |
| 2007/0078566 | A1* | 4/2007 | Wang | G06F 19/3437 700/259 |
| 2009/0276105 | A1* | 11/2009 | Lacaze | G05D 1/0044 701/2 |
| 2010/0131102 | A1* | 5/2010 | Herzog | B25J 5/00 700/259 |
| 2010/0332033 | A1* | 12/2010 | Diolaiti | B25J 9/1689 700/259 |
| 2013/0218336 | A1* | 8/2013 | David | B25J 9/1671 700/248 |

* cited by examiner

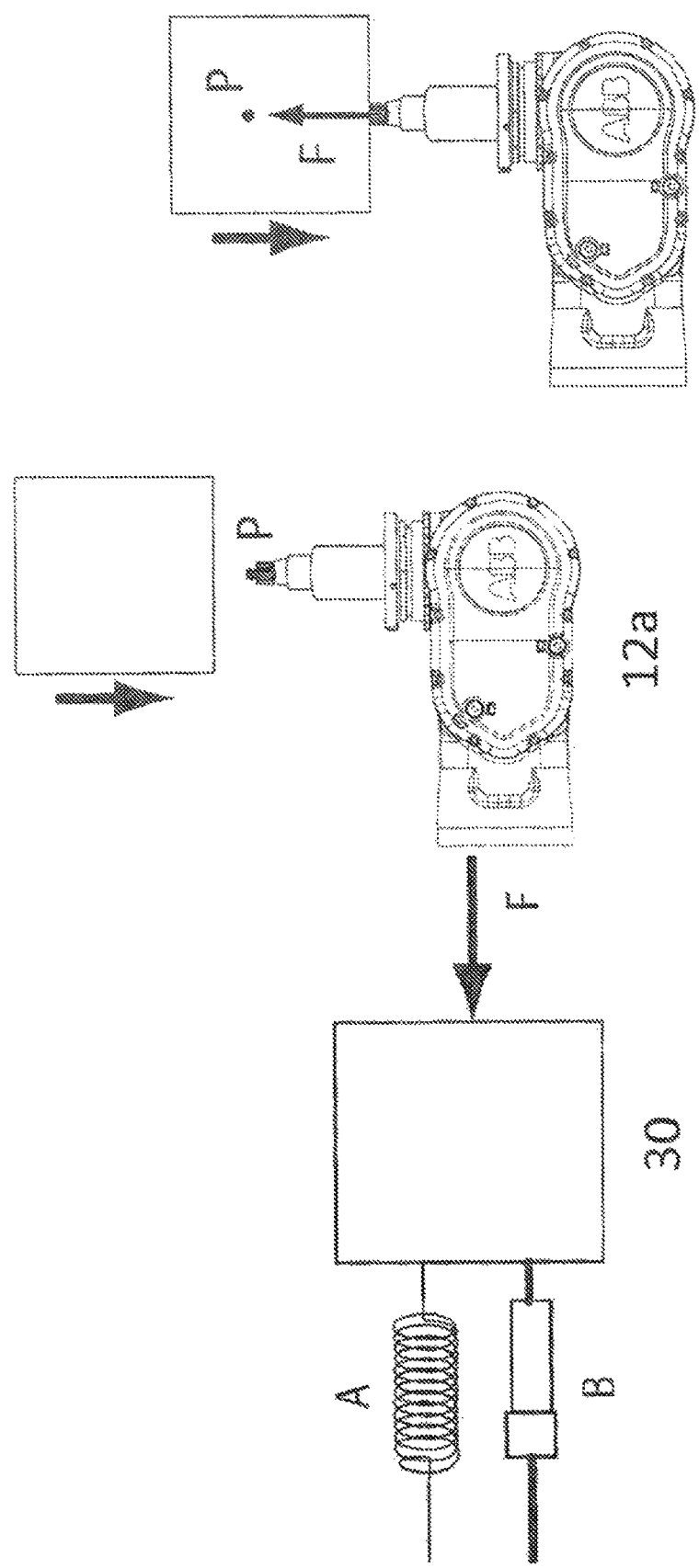

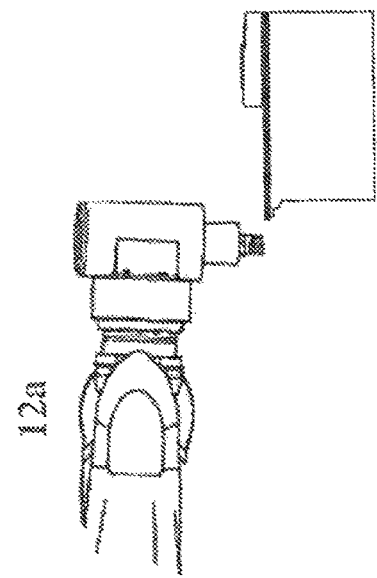
Fig. 4a
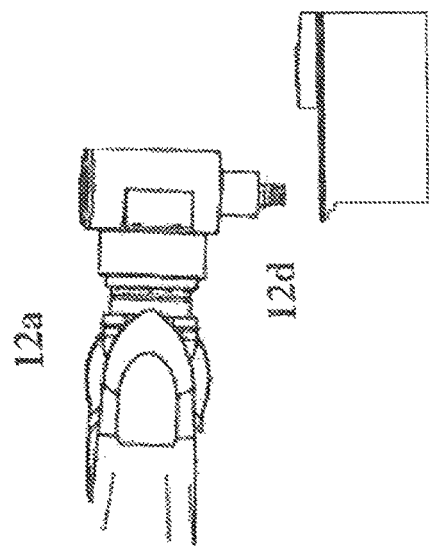
Fig. 4b
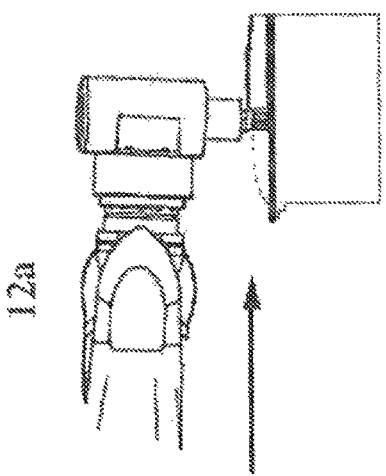
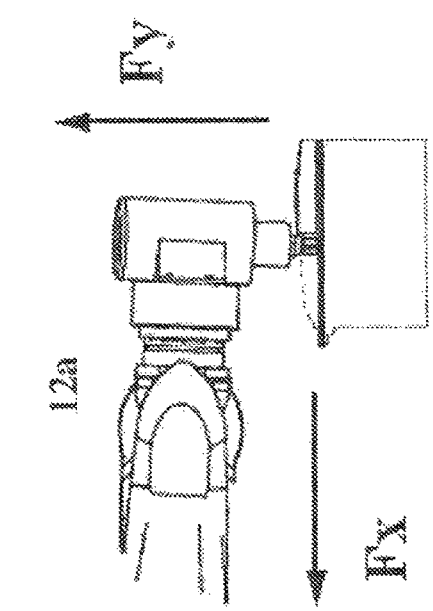

TELEOPERATION OF MACHINES HAVING AT LEAST ONE ACTUATED MECHANISM AND A FAULT DETECTION AND RECOVERY SYSTEM

CROSS REFERENCE TO RELATED APPLICATIONS

This application is a continuation of U.S. patent application Ser. No. 14/649,160, filed Jun. 2, 2015, which is a national stage entry of PCT/US2013/072737, filed Dec. 3, 2013, which claims the benefit of U.S. Provisional Application No. 61/732,702, filed Dec. 3, 2012, each of which is incorporated herein by reference in their entirety.

FIELD OF THE INVENTION

This invention relates to the teleoperation of one or more robots or other machines with at least one actuated mechanism.

DESCRIPTION OF THE PRIOR ART

Teleoperation of an industrial robot occurs when the operator of the teleoperated industrial robot as located apart from the robot when the industrial robot performs work. An industrial robot is an automatically controlled, reprogrammable, multipurpose manipulator programmable in three or more axes. Examples of industrial robots are robots located at a fixed position that are mobile by themselves or mobile because the robot is mounted on a device that it is itself mobile such at a motorized vehicle or mounted on a tract or gantry etc.

By located apart from each other is meant that the operator and teleoperated industrial robot are either within the line of sight of each other or are separated from each other by a barrier through which the operator can see the robot that is controlled by the operator, or are at a distance from each other such that the operator cannot see the robot with his or her eyes. If there is a see through barrier, the barrier separates the operator from work performed by the robot that is hazardous to the health or safety of the operator.

The principal applications for teleoperated industrial robots are machining, handling of hazardous materials, assembling/disassembling, operation in a contaminated environment, inspection and service, or other operations in an unmanned, harsh outdoor environment such as offshore, desert, Arctic, Antarctic, subsea and space.

SUMMARY OF THE INVENTION

A system for teleoperation of a machine has at least one actuated mechanism and a predetermined number of degrees of freedom. The system comprises:

a control station remotely located from a location of the machine, the machine controlled from the control station to perform a predetermined function;

a two way real-time communication link between the machine and the remotely located control station; and a controller at the machine location having therein program code, the program code configured to determine from data from one or more sensors at the machine location if an actual fault has occurred in the machine when the machine is performing the predetermined function, the program code further configured to determine from the sensor data when an actual fault has occurred one or more times for the fault and transmit the one or more fault types to the control station for analysis at the control station.

A system for teleoperation of a machine has at least one actuated mechanism and a predetermined number of degrees of freedom. The system comprises:

a control station remotely located from a location of the machine, the machine controlled from the control station to perform a predetermined function;

a two way real-time communication link between the machine and the remotely located control station; and a controller at the machine location having therein program code, the program code configured to be a preprogrammed trap routine which will be automatically executed by the controller to take actions when an error in supervision of the machine by the control station is detected at the machine location.

DESCRIPTION OF THE DRAWING

FIG. 3 shows a drawing for the safe stop and reduce contact force routine.

FIG. 4a shows a drawing for the safe stop and release contact force routine.

FIG. 4b shows the automatic retraction of the tool along the contact force direction.

DETAILED DESCRIPTION

Figure 1:
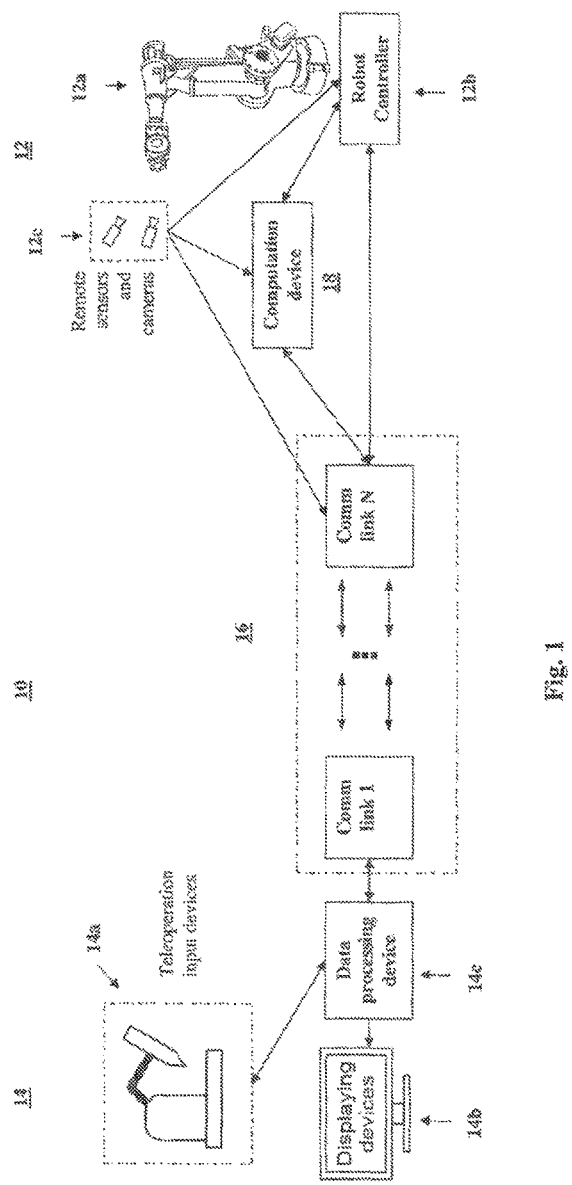
FIG. 1 shows an embodiment for a system for a teleoperated industrial robot.

Referring now to FIG. 1, there is shown a system 10 that has at least one remote robot station 12, at least one operator station 14 and, at least one communication link 16 between the robot station 12 and the operator station 14. The physical distance between the remote robot station 12 and the operator station 14 can vary from "next door" to each other to "another continent".

The robot station 12 includes at least one robot 12a. Robot 12a is for example a six degree of freedom industrial robot available from ABB.

Robot station 12 also includes a robot controller 12b that includes a data interface which accepts motion commands and provides actual motion data, and optionally one or more remote sensor devices 12c that observe the robot station 12 and attached processes, such as cameras, microphones, position sensors, proximity sensors and force sensors. The sensor devices 12c may either be smart sensors, that is, the sensor device 12c includes data processing capability or not smart sensors, that is, the sensor device 12c does not include data processing capability.

If the sensor devices 12c are smart sensors then the output of the sensor devices is connected directly to robot controller 12b. If the sensor devices 12c are not smart sensors, then their output can be connected, either to a computation device 17 to process the sensor device output or to the communication link 16 described in more detail below so that the sensor device output is processed in data processing device 14c.

The robot station 12 can also include as an option one or more actuators and other devices (not shown in FIG. 1 but well known to those of ordinary skill in this art), that are mounted to the robot or next to the robot, such as grippers, fixtures, welding guns, spraying guns, spotlights and conveyors.

The controller 12b has the program which when executed controls the motion of the robot 12a to perform work. As well known, the robot may hold a tool, not shown, which is used to perform work on a stationary or moving workpiece, not shown, or may hold the workpiece which has work performed on it by an appropriate tool. The remote sensor devices 12c provide input signals to the controller 12b that the controller uses to control the robot 12a in performance of the work.

The operator station 14 has at least one teleoperation input device 14a such as joysticks or stylus-type devices which the operator uses to create continuous motion signals (position or speed signals). When force feedback is added to these devices they become haptic devices. This feedback causes a vibration in the joystick and the operator feels the force feedback in the stylus-type devices.

The signals from these input devices 14a are used by the controller 12b to operate the robot 12a. The device side also has at least one display device 14b and a data processing device 14c which is connected to both the input devices 14a and the display devices 14b.

The monitoring (display) device 14b shows actual data about the robot motion and attached processes, for example, camera images, acoustic feedback and sensor values. The data processing device 14c processes data in both directions. Device 14c may for example be an industrial PC or a PLC.

The operator station 14 may also include a safety enable device (not shown in FIG. 1) that is separate and distinct from input devices 14a and may for example be a three position switch. The safety enabling device enables and disables power to the robot 12a and attached processes.

The communication link 16 connects the robot controller 12b and the data processing device 14c to each other. The communication link 16 comprises one or more communication links 16-1 to 16-N.

The communication link 16 between the operator station 14 and the robot station 12 may be realized with various technologies (e.g. fiber-optic/radio/cable on different types and layers of data protocols). A major portion or the entire infrastructure of the communication link may already exist and be used for other purposes than teleoperating robots. Typical examples are existing Ethernet installations with LAN and WLAN, Bluetooth, ZigBee and other wireless industrial links, point-to-point radio systems of laser-optical systems, and satellite communication links.

System 10 is operated to maintain a reliable "real-time" communication link 16 between device side 14 and the remotely located robot side 12. The system 10 changes parameters of the communication link 16 and the robot motion, depending on the current available data rate and/or transmission time of the communication link 16.

In system 10, the operator has direct remote control of the motion of robot 12a and attached processes. Thus the term "real-time" as used herein is in the context of teleoperation of the motion of a robot 12a or a machine. The teleoperation is considered to be real-time if:

a maximum delay between operator commands, robot motion, and feedback about robot motion and attached processes at the operator station is not exceeded, and the maximum delay is dependent on the speed of machine motion, i.e. with a slow machine motion a slightly longer delay is acceptable, and the maximum delay is deterministic, i.e. the delay time does not significantly vary over time.

Exceeding the maximum delay may result in damage to the workpiece or to the robot or other equipment on the robot side. For example, if the teleoperated robotic is used in a grinding application and the communication delay exceeds the maximum delay, this causes the operator to remove more material from the workpiece than desired. This excess removal of material can result in damage to the workpiece. Also for example, if the teleoperated robot is used in a material handling application, the communication delay exceeding the maximum delay causes the collision between the robot 12a and other equipment on robot side.

This understanding of "real-time" is similar to real-time computation, where not only wrong results of logic and arithmetic operations can occur but also not timely results cause errors.

A fault such as a collision, communication failure or a dangerous robot movement may occur during the operation of a teleoperated robot. Traditionally the robot is stopped immediately upon the occurrence of the fault by an emergency stop (E-stop) mechanism. This mechanism stops the robot movement by mechanical braking systems and cuts off power to the robot motors. However, the E-stop makes recovery difficult and inconvenient to the operator of the teleoperated robot as the operator cannot access the teleoperated robot due to the distance between the operator and the robot or the hazardous environment in which the teleoperated robot is used.

Figure 2:
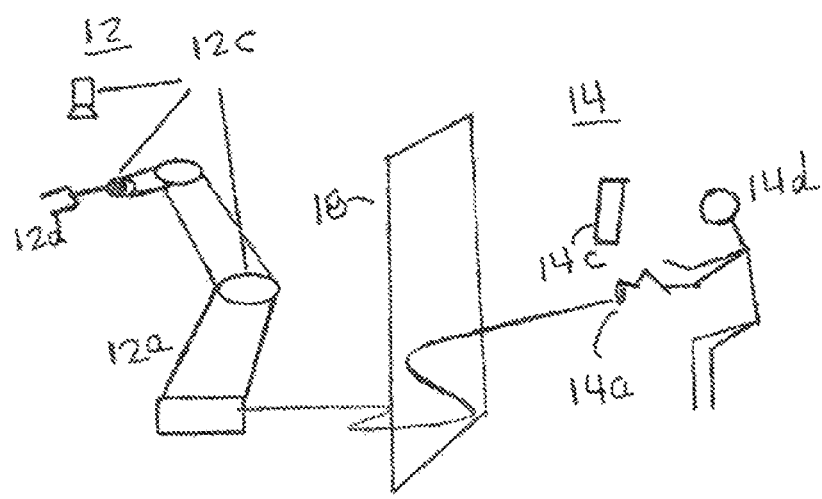
FIG. 2 shows an embodiment for the system of FIG. 1 which also shows an obstacle or a distance between the teleoperator and the robot.

FIG. 2 illustrates the robot teleoperation system 10 in a manner similar to that shown in FIG. 1 with the added elements described herein. An element in FIG. 2 that is identical to the same element shown in FIG. 1 has the reference numeral used for that element in FIG. 1. For ease of illustration, the display 14b and the data processing device 14c shown in FIG. 1 are not shown in FIG. 2.

System 10 has a robot 12a that resides in a remotely located robot station 12 with a tool 12d held by robot 12a and sensors 12c that are on and surround the robot 12. A controlling input device 14a in the operator station 14 is connected with the robot 12a through wire or wireless communication such as communication link 16 of FIG. 1. An operator 14d operates the device 14a and locks either at a monitor 14b (see FIG. 1) to observe the robot 12a from a distance or through a barrier 18 that is between the robot 12a and the controlling input device 14a.

While not shown in FIG. 2, there is a controller such as controller 12b of FIG. 1 that is associated with robot 12a. The controller 12b is a computing device connected to the robot 12a that is programmed to respond to commands from the controlling input device 14a to use the tool 12d to perform a predetermined operation.

The error handling features of system 10 are as follows:

1) When an error occurs, an application specific user programmable trap routine written in robot program language is automatically executed. There is no need for any human intervention. The trap routine can handle application specific requirements such as for example turning off a spindle.

2) The trap routine is invoked automatically when a teleoperation supervision error is generated by the robot controller 12b. For example, the trap routine is automatically invoked when there is a loss of communication or the robot speed limit is exceeded.

3) A default trap routine is provided if an application specific trap routine is not provided by a programmer for the user of the robot 12a.

4) When a teleoperation error occurs, the robot 12a can take some standard recovery actions in addition to the application specific options such as reducing the robot position gain so that the robot 12a is soft and can backtrack along the path or contact force direction to reduce contact. These actions can be put in the trap routine. A soft robot has a reduced stiffness and this means that less contact force is needed to cause the robot 12a to move a given distance.

Several examples of a safe stop routine are as follows:

Safe stop and reduce contact force routine: This routine is a controlled stop with power available to the motors to achieve the stop for all contact teleoperation applications. The robot position at stop acts as a reference position and the stiffness parameters A and B, shown in FIG. 3, in the robot controller 12b are decreased, that is, the robot 12a is becoming "soft". If there is an external contact force (F in FIG. 3) between the robot 12a and the part 30, the robot 12a acts as a spring and moves away from the stop position along the contact force direction. Therefore the contact the force is reduced.

Safe stop and release contact force routine:

This routine releases all the contact pressure after a controlled stop. The robot controller 12b records the robot's recent path (the arrow shown in FIG. 4a) from the nearest free space, that is no contact force, to the current stop position, which is either controlled by the operator 14d through the tele-operated device 14a or the robot program. Then the robot 12a automatically retracts the tool 12d along this path after the safe stop. This small movement releases all the contact pressure.

The robot 12a may also automatically retract the tool 12d along the contact force direction, which is the combination of Fx and Fy shown in FIG. 4b, to the nearest free space.

This safe stop and release contact force can be used in contact teleoperation applications, such as telemachining. For example in the teleoperated grinding application, after the safety stop, the grinding tool needs to be moved away from the part in order to prevent uncontrolled material removal. The robot controller 12b can use the remembered, that is recorded recent, path, which is how the operator 14d moved the grinder from the nearest free space to the current position, to retract the grinder.

5) For loss of communication, the robot 12a is stopped if it is still moving and is then put into the safe stand still supervision made so that the robot 12a does not move its axes. When the robot 12a is moving, the safe stand still supervision mode energizes the servo and drive system for the motor of each robot axis, but holds the robot axes not to make any movement. This mode allows the robot 12a to quickly resume motion after the communication is recovered. When the robot 12a is not moving, the robot 12a is in a safe stop mode. The servo and drive system is not energized. The mechanical brake is engaged to hold each axle.

Safe Stand-still stop is a controlled stop with power available to the robot motors to achieve the stop. The robot controller 12b supervises that the robot 12a is standing still even if the servo and drive systems are in regulation, that is, if these systems are energized the robot controller prevents robot motion until communication is restored.

This Safe Stand-still stop can be used in remote non-contact teleoperation applications, for example, teleoperated inspection. If the communication between the teleoperation device 14a and robot controller 12b is lost, the robot 12a holds the sensor at the Safe Stand-still stop positron and waits for the communication to recover, this stop enables the operator 14b to continue the teleoperation immediately once the communication is restored, saving cycle time and wear on the contactors and the brakes.

6) Robotic measurement devices (sensors such as an encoder, force sensor and vision camera (see FIG. 1) are used in the fault status detection and recovery process monitoring; and 7) The fault recovery is performed on both sides of the system 10—the teleoperated robot 12a and its controlling device 14a.

A robot program such as RAPID available from ABB is running in the background in the robot controller 12b to monitor the robot motion through various sensors on and around the robot 12a. When a fault (e.g. a fixture failure; or undesired motion is detected, the robot program receives the fault status information from the sensors, informs the operator 14d at the controlling device 14 and asks for the recovery command. The operator 14d selects a specific fault handling and recovery procedure to be used and issues the recovery command. Upon receipt of the command, the robot 12a follows the predetermined rules that reside in the robot controller 12b and starts the automatic fault recovery procedure.

Figure 5:
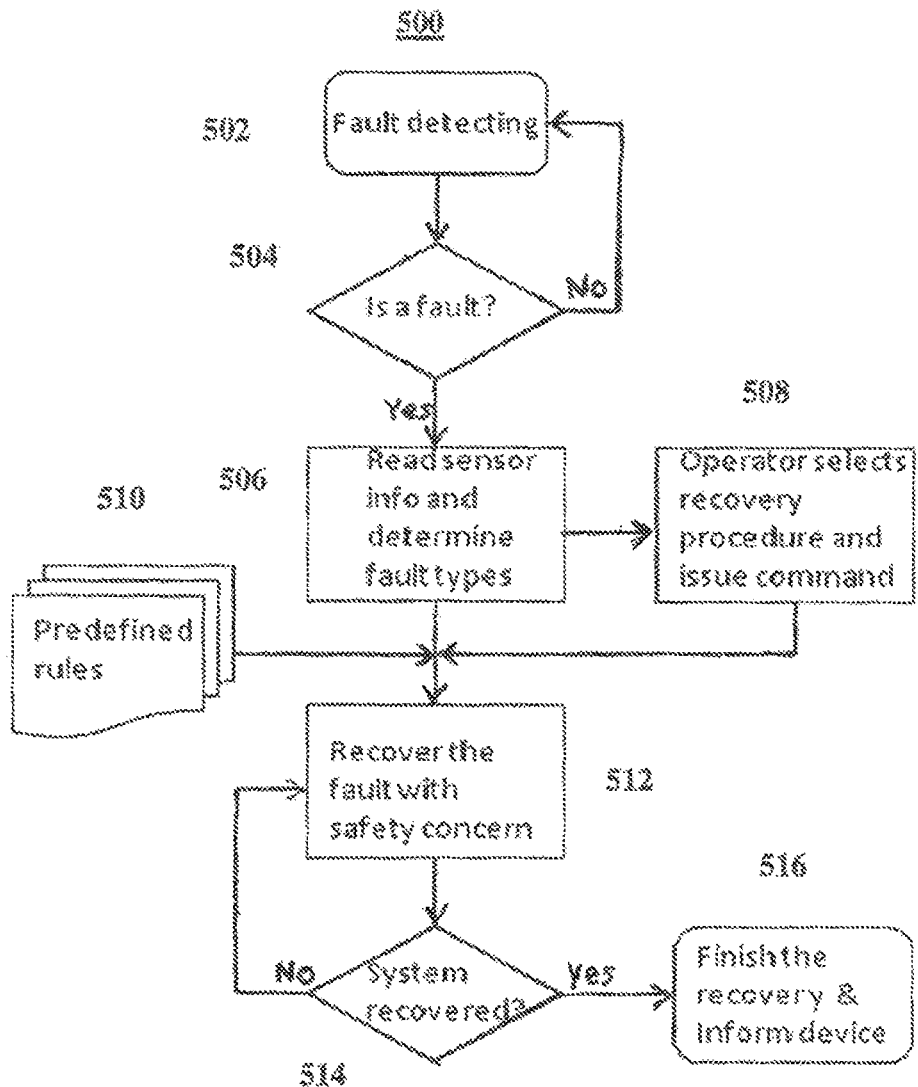
FIG. 5 shows a flowchart for the robot fault detection and recovery system process.

FIG. 5 shows the flowchart 500 for the robot fault detection and recovery system process. At block 502 data about a possible fault that has been detected is received by the robot program. At decision block 504 the robot program determines from the received data if there is an actual fault. If the answer is no, the program returns back to block 502. If the answer is yes, the program proceeds to block 506 where the information from the sensors is read and the program determines from that information the fault types. The information about the fault types is sent to the operator and at block 508 the operator selects the recovery procedure and issues the recovery command for that procedure.

There are as shown in block 510 stored predefined rules for recovering from a fault. The rules ensure that the recovery from the fault meets the safety requirements for the operation of the robot. At block 512 the recovery process is started using the predefined rules and the issued a recovery command.

At decision 514 it is determined if the system has recovered from the fault. If not, the flow returns to block 512. If the system has recovered from the fault, the flow proceeds to block 516 where the recovery is finished and the controlling device is informed that the recovery is completed from the robot side.

During the recovery, the operator 14d on the device side 14 can monitor the progress and status of the recovery using the sensor data obtained from the robot side 12. If the operator 14d determines that the automatic recovery process is not going as expected, that is, the system is not recovering, the operator 14d can interfere to alter the recovery process to a desired recovery. However, once started, the robot recovery process can be performed independently without operator interference.

It should be noted that loss of communication is also a possible fault in which the operator 14d does not have the control over the robot 12a. In this case, the robot 12a has to conduct the recovery by itself based on predefined rules stored in the robot controller 12b. For example, the robot 12a could retreat from its current task and return to home in a safe way or stay at the current position (status) awaiting further commands from the controlling device 14a after the communication is resumed.

When the system is recovered from a fault on the robot side 12, the controlling device 12b is informed and starts its own recovery process. The robot program (RAPID) recovery procedure is also used in the device side fault recovery.

Figure 6:
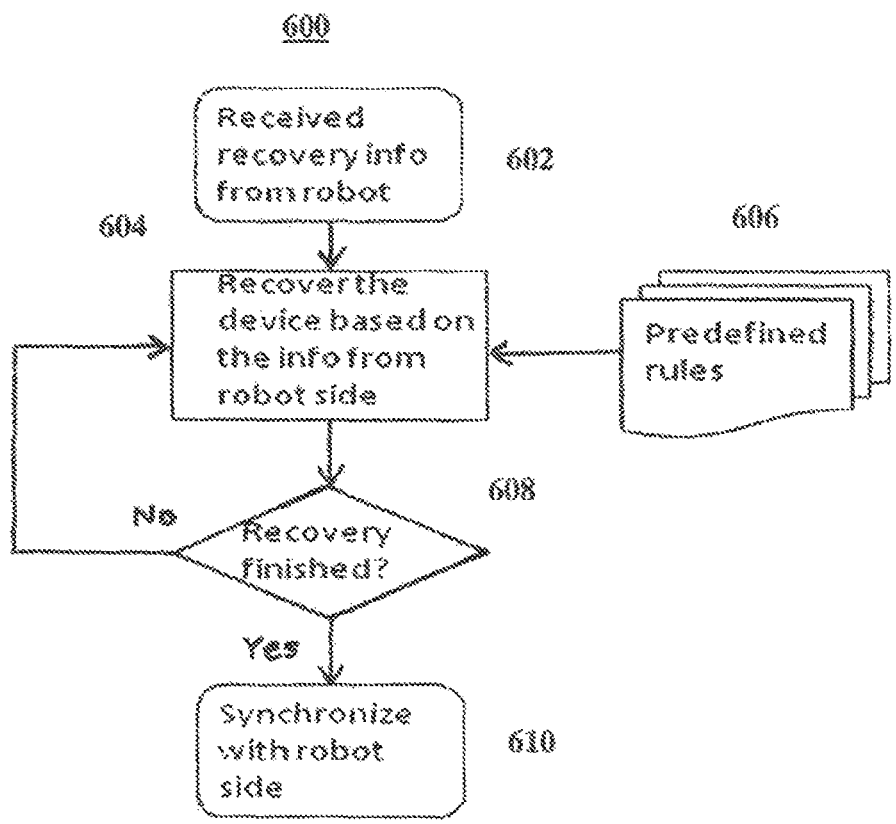
FIG. 6 shows a flowchart for the robot fault detection and recovery system process.

FIG. 6 shows a flowchart 600 for the robot fault detection and recovery system process. At 602, the device side has received the information from the robot side that the recovery has occurred at the robot aide. At 604, the recovery at the device side is initiated based on the information from the robot side and the predefined rules 606.

Decision 608 if the device side recovery is finished. If not, the flow returns back to block 604. If it has, the flow proceeds to block 610 where the recovery at the device side is synchronized with the recovery at the robot side.

It is to be understood that the description or the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system comprising:
a robot station having a robot and a controller, the robot having a plurality of degrees of freedom, the robot further having, for each of the plurality of degrees of freedom, a servo, drive system, and motor; and
a control station communicatively coupled to the robot station, the control station configured to teleoperably control an operation of the robot,
wherein the controller transmits, when a fault has occurred during an operation of the robot, one or more fault types for the fault to the control station,
wherein the controller receives, from the control station after transmission of the one or more fault types to the control station, a selected recovery procedure for handling the fault, wherein upon receipt by the controller of the selected recovery procedure, the controller executes predefined rules stored in the controller and the selected recovery procedure for recovery from the fault, and
wherein the predefined rules comprises (1) recording a free space position along a robot path at which the robot was not subjected to an external impact force, (2) executing a controlled stop of the robot, and, (3) subsequent to executing the controlled stop, displacing the robot to the free space position.

2. The system of claim 1, wherein the robot has a plurality of degrees of freedom, and wherein the control station further includes one or more teleoperation devices configured to be selectively manipulated to generate one or more signals used to control a movement of the robot about at least one axis associated with the plurality of degrees of freedom during the operation of the robot.

3. The system of claim 1, wherein the predefined rules comprises reducing a robot position gain to reduce a stiffness of the robot to exposure of the robot to an external impact force.

4. The system of claim 1, wherein the predefined rules comprises a controlled stop of the robot and a reduction in a stiffness parameter of the robot.

5. The system of claim 1, wherein the predefined rules comprises, following the robot being subjected to an external impact force, automatically retracting the robot in a direction corresponding to a contact direction of the external impact force.

6. The system of claim 1, wherein the predefined rules comprises, in response to a loss of communication between the robot station and the control station while the robot is moving, both (1) bring movement of the robot about the plurality of degrees of freedom to a controlled stop, and (2) energizing the servo and drive system for each of the plurality of degrees of freedom for subsequent movement about one or more of the plurality of degrees of freedom upon restoration of communication between the robot station and the control station.

7. A system comprising:
at least one robot station having a robot, a controller, and one or more sensors, the robot having a plurality of degrees of freedom; and
a control station having a data processing device, the control station being communicatively coupled to the robot station, the control station having at least one teleoperation device structured for selective manipulation to generate one or more signals used to control a movement of the robot about an axis of least one of the plurality of degrees of freedom during an operation of the robot,
wherein based on data provided from the one or more sensors the controller detects an occurrence of a fault condition relating to the operation of the robot, and, in response to a detection of the occurrence of the fault condition, facilitates transmission of a fault recovery request from the at least one robot station to the control station,
wherein the controller receives, in response to the fault recovery request, a selected recovery procedure from the control station, whereupon the controller executes predefined rules stored in the controller and the selected recovery procedure for recovery from the detected fault condition,
wherein the one or more sensors provide information regarding a recovery at the at least one robot station from the fault condition,
wherein the data processing device initiates a recovery of the control station based, at least in part, on information from the controller and the selected recovery procedure, and
wherein, after execution by the controller of the selected recovery procedure, and before the recovery from the fault condition is completed, the controller executes, when the recovery has not proceeded as expected, a different selected recovery procedure, as selected at the control station.

8. The system of claim 7, wherein data from the one or more sensors is used to monitor the recovery from the detected fault condition, and further wherein based on information from the one or more sensors, the controller receives instructions from the control station to change the selected recovery procedure.

9. The system of claim 8, wherein, upon recovery of the robot from the fault condition, the controller is further configured to transmit to the control station an indication that the robot has recovered from the fault condition.

10. The system of claim 9, wherein the fault recovery request includes an indication of each of one or more possible fault types.

11. The system of claim 10, wherein the selected recovery procedure is selected, at the control station, from a plurality of recovery procedures.

12. The system of claim 7, wherein the controller is further configured to determine one or more possible fault types associated with the detected fault condition.

13. A system comprising:
a robot station having a robot and a controller, the robot having a plurality of degrees of freedom; and
a control station having a data processing device that is communicatively coupled to the robot station, the control station configured to teleoperably control an operation of the robot, the control station having one or more teleoperation devices configured to be selectively manipulated to generate one or more signals used to control a movement of the robot about one or more of the plurality of degrees of freedom,
wherein the controller determines when a fault has occurred during an operation of the robot, and, after determining an occurrence of the fault, transmits one or more fault types for the fault to the control station,
wherein the controller receives, from the control station and after transmission of the one or more fault types to the control station, a selected recovery procedure for handling the fault, and wherein upon receipt by the controller of the selected recovery procedure, the controller executes predefined rules stored in the controller and the selected recovery procedure for recovery from the fault, the predefined rules comprising a safe stop routine that at least brings the robot to a controlled stop; and
wherein the data processing device is configured to receive, from the controller, a recovery signal indicating the recovery from the fault, whereupon the data processing device initiates a recovery of the control station based, at least in part, on information from the controller and the executed predefined rules, wherein recovery of the control station comprises synchronizing the robot station with the control station.

14. The system of claim 13, wherein the recovery of the control station is also based on the selected recovery procedure.

15. The system of claim 14, wherein the robot station further includes one or more sensors that provide information regarding at least the fault and the recovery from the fault.

16. The system of claim 15, wherein, after execution by the controller of the selected recovery procedure, and before the recovery from the fault is completed, the controller executes, when the recovery has not proceeded as expected, a different selected recovery procedure, as selected at the control station.

* * * * *